No. 646,549. Patented Apr. 3, 1900.
E. ABERLI.
DISPLAY MAP OR CHART.
(Application filed July 24, 1899.)
(No Model.) 2 Sheets—Sheet 1.
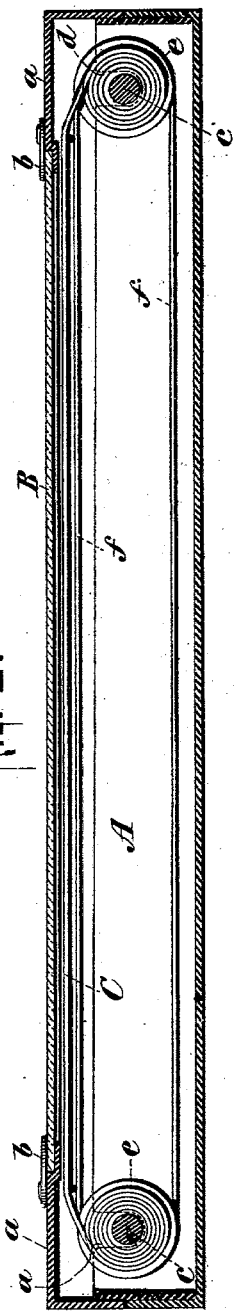
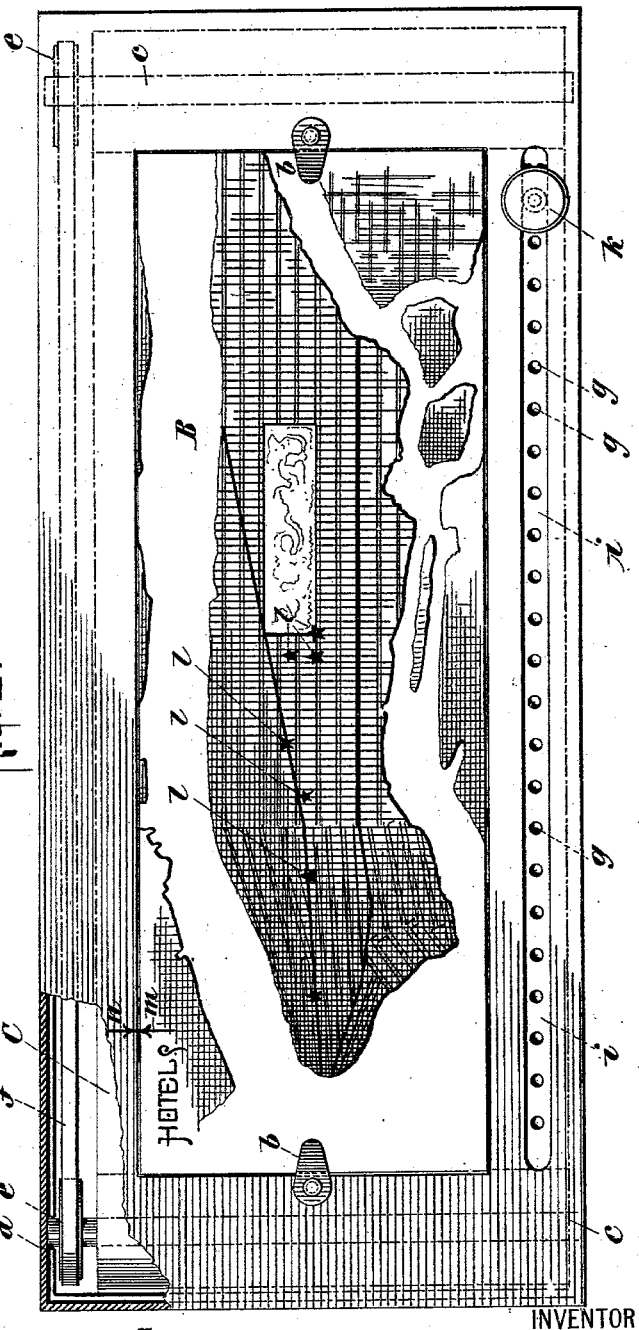
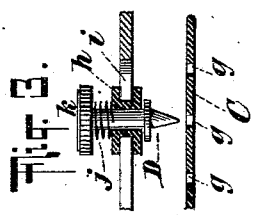
WITNESSES: INVENTOR
Edward Aberli
BY
ATTORNEYS No. 646,549. Patented Apr. 3, 1900.
E. ABERLI.
DISPLAY MAP OR CHART.
(Application filed July 24, 1899.)
(No Model.) 2 Sheets—Sheet 2.
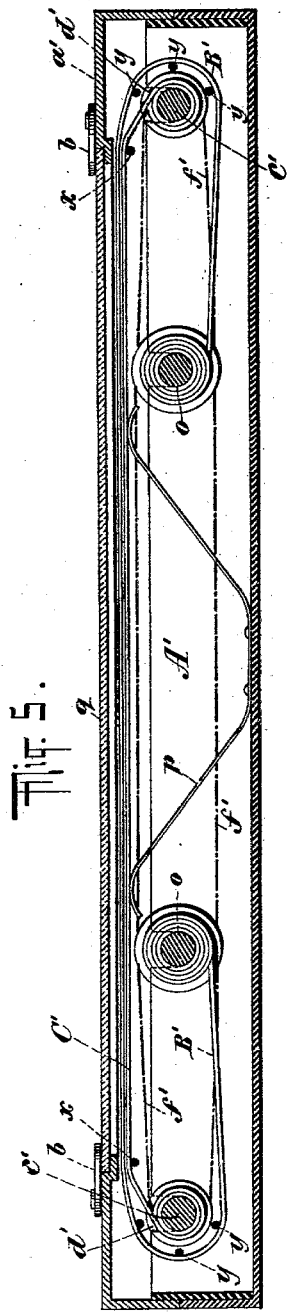
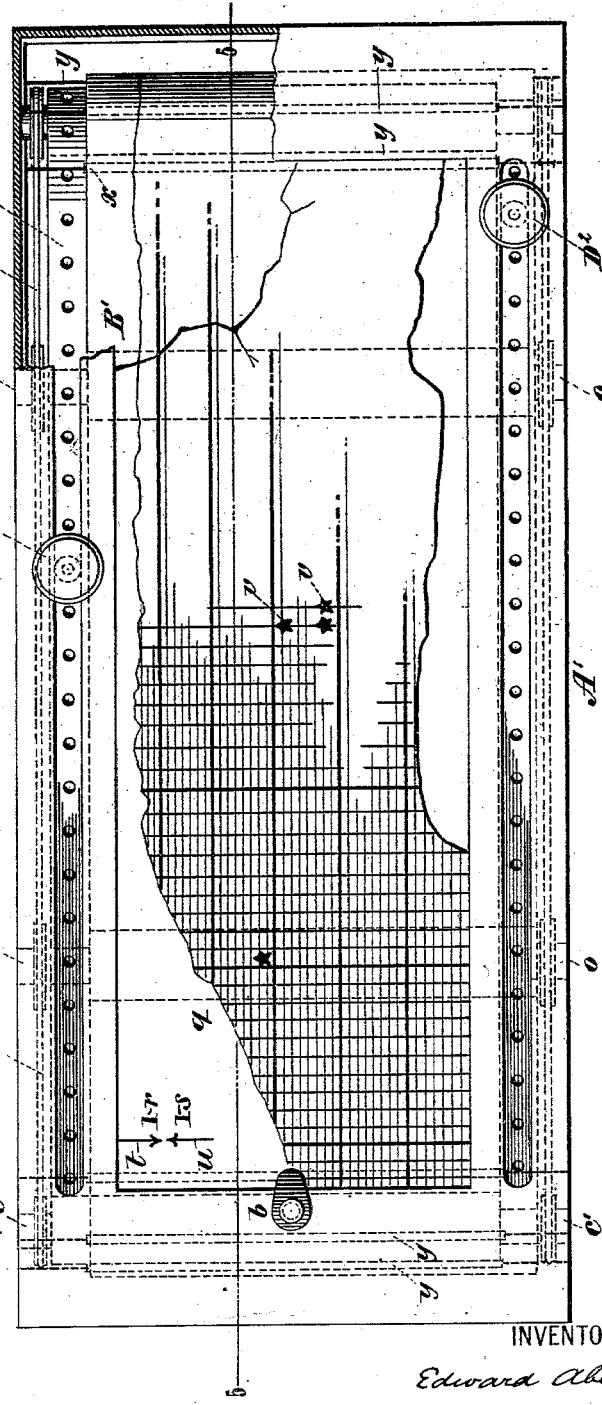
WITNESSES:
INVENTOR
Edward Aberli
BY
ATTORNEYS

UNITED STATES PATENT OFFICE.

EDWARD ABERLI, OF NEW YORK, N. Y.

DISPLAY MAP OR CHART.

SPECIFICATION forming part of Letters Patent No. 646,549, dated April 3, 1900.

Application filed July 24, 1899. Serial No. 724,889. (No model.)

*To all whom it may concern:*

Be it known that I, EDWARD ABERLI, a resident of New York, (Fort Wadsworth,) Richmond county, in the State of New York, have invented certain new and useful Improvements in Display Maps or Charts, of which the following is a specification.

My invention relates to display maps or charts; and the object thereof is to provide a simple, cheap, and efficient device wherein a single ground-map will answer to readily designate and locate various points.

To this end the invention consists in the novel arrangement and combination of parts to be hereinafter described and claimed.

In the accompanying drawings, wherein like reference characters represent corresponding parts in the various views, Figure 1 is a plan view of one form of construction embodying my invention. Fig. 2 is a central longitudinal vertical sectional view of the same. Fig. 3 is an enlarged fragmentary detail view of one form of device employed by me for transmitting motion to the parts, as will hereinafter more fully appear. Fig. 4 is a plan view of another form of device embodying my invention. Fig. 5 is a central longitudinal sectional view of the same, taken on the line 5 5 of Fig. 4.

Reference being first had to Figs. 1, 2, and 3 of the drawings, A designates a suitable casing which may be provided with a cover $a$, which is centrally apertured to expose a suitable chart or map, such as the ground plan B. In Figs. 1 and 2 of the drawings this chart or map is made upon a transparent plate which is retained in place by movable catches $b$, so that one map may be substituted for another. The casing A contains suitable removable rollers $c$, on which are wound what I term a "designation" piece or strip C. These rollers are shown removable in the present instance by being contained within slotted bearings $d$, and each roller is provided with a pulley $e$, which pulleys are united by a belt or band $f$, so that when motion is transmitted to one roll the other is rotated to a corresponding extent. The strip C may be suitably reinforced along one edge and the reinforced portion provided with a series of apertures $g$, with which a spring-pressed engaging piece D (see Fig. 3) coöperates. This engaging piece D is suitably pointed at one end and moves within a flanged sleeve $h$, that moves along an elongated slot $i$ in the cover of the device. A coiled spring $j$ normally maintains the lower end of the engaging piece out of contact with the strip C, as represented in Fig. 3 of the drawings. When it is desired to move the strip C, the engaging piece D is depressed by bearing upon the head $k$ thereof until the pointed end of such engaging piece is received within one of the perforations $g$ in the strip C, when the engaging piece D is moved along the slot $i$, thereby moving the strip C with it from one roller to another. The strip C carries a series of groups of designations. Thus, for instance, one group of designations $l$ will indicate hotels, another theaters, another churches, another railroads, and so on, and for each group of such designations an indicating device $m$ is provided. In the present instance this designation $m$ consists merely of an arrow printed upon the strip C and which is adapted to register with a corresponding designation $n$, carried upon the cover or other suitable fixed portion of the device. Each group of designations $l$ is adapted to be brought into proper position to be read in connection with the chart or ground plan of the city, as shown in the present instance, when the indicating device $m$ is in register with the corresponding indicating device $n$— that is to say, the designations $l$, which we will assume are meant to indicate hotels, are properly located upon the map when the arrows $m$ $n$ are in register. When the location of churches, for instance, is desired, it is merely necessary to depress the engaging piece D and transmit movement to the strip C in the manner hereinbefore described to bring another section of the strip with its groups of designations in place under the transparent map B, and when the arrow $m$ for this particular group is in register with the arrow $n$ the designations will be properly located with relation to the map of the city. It will be readily understood that by this construction one transparent map B may be readily substituted for another and the rolls $c$ may be withdrawn from the casing, together with their indicating-strip, and another set of rolls and indicating-strip substituted therefor.

In Figs. 4 and 5 of the drawings I have illustrated a somewhat-different arrangement. In this construction the casing A' is provided with the slotted bearings d', as in the construction first described, for the reception of the rollers c', which carry an indicating-strip C', which passes over suitable guide-rollers x, and the parts are retained in position by a cover a'. In this last construction, however, the transparent map B' instead of being fixed is carried upon rollers o, which are removable from the casing in a similar manner to the rollers c'. The map B' passes around suitable guide-rollers y and extends over the strip C'. A suitable spring e may be provided for maintaining the strip and chart properly positioned in the casing, which may, if desired, be provided with a transparent plate q. Each pair of rollers c' o are united by belts f', and motion is transmitted to the chart by an engaging piece D', whereas the strip is moved by a like engaging piece $D^2$, constructed as illustrated in Fig. 3 of the drawings.

From Fig. 4 of the drawings it will be seen that the map B' does not extend to one edge of the strip C', so that the map will not interfere with the engaging piece D', and the opposite edge of the strip C' does not extend to the reinforced edge of the map B', so that the strip C' does not interfere with the operation of the engaging piece $D^2$ in its movement to convey the map to the desired point. The strip C' has an indicating designation, as represented at r, and a corresponding designation s is carried upon the transparent map, by which means corresponding sections are identified—that is to say, it will be understood when corresponding designations are brought into view that the two sections bearing these corresponding designations relate to each other, and suitable means, such as the arrows t u, indicate when these sections are brought into proper relation to each other to afford a proper reading of the indicating characters v. The arrow t is carried upon the indicating-strip D', whereas the arrow u is carried upon the transparent map, and when the two are brought in register it indicates that they are in proper position with relation to each other, so that the hotels or other places indicated by the stars v are properly located on the map.

It will be observed that in each of the constructions shown and described the character of the ground-plan map itself is in no way changed by the use of the strip carrying the designations, they merely appearing at their proper relative positions when the strip is moved to the proper position, so as to be viewed through the transparent map.

While I have described with considerable exactness two forms of constructions embodying my invention, I will have it understood that I do not wish to be limited to the specific construction shown and described, inasmuch as various modifications may be made without departing from the spirit of my invention.

Having described my invention, what I claim, and desire to secure by Letters Patent, is—

1. The combination of a transparent groundplan map and a separate removable piece having designations to be read in connection with the said map when viewed therethrough without changing the character of the map itself.

2. The combination of a transparent groundplan map, a separate piece having designations to be read in connection with said map when viewed therethrough without changing the character of the map itself, and means for determining when the designations bear the proper relation to the map to afford a proper reading of one in connection with the other.

3. The combination of a casing carrying a transparent map, a separate movable piece having separate groups of designations to be read in connection with said map when viewed therethrough so as to determine the location on the map of the points indicated by said designation and means for moving the movable piece with relation to the map so that each of the various groups of designations on the movable piece may be brought into register and read in connection with the map.

4. The combination of a casing carrying a transparent map, a separate movable piece having separate groups of designations to be read in connection with said map when viewed therethrough, means for moving the movable piece with relation to the map so that each of the various groups of designations on the movable piece may be brought into register and read in connection with the map and the location of each of the points indicated by the separate designations of each group may be determined and means for determining when the designations bear the proper relation to the map to afford a proper reading of one in connection with the other.

5. The combination of a casing, a movable transparent map having separate sections each of which sections is different from the remaining sections, means for moving said map in the casing, a movable piece having separate groups of designations each of which groups is adapted to be read in connection with one of the sections of said map when viewed therethrough, means for moving the movable piece with relation to the map and indicating means for determining when a separate group of designations is in position to be read upon its respective section of the map.

6. The combination of a casing, an exposed transparent map contained therein, a movable strip carrying designations which are adapted to be moved under said map and read in connection therewith when viewed therethrough, rolls upon which said strip is carried and hand-operated means independent of said rolls for moving said strip in either direction.

7. The combination of a casing, an exposed removable transparent chart contained therein, a movable strip carrying designations which are adapted to be moved under said chart and read in connection therewith when viewed therethrough, rolls upon which said strip is carried and a hand-operated spring-pressed engaging piece carried by said casing and adapted to engage the strip to move it in either direction.

8. The combination of a casing, a movable transparent chart contained therein, removable rolls upon which said chart is carried, a movable strip carrying designations which are adapted to move under said chart and to be read in connection therewith when viewed therethrough, a hand-operated spring-pressed engaging piece carried by the casing and adapted to engage the chart to move it in either direction, removable rolls upon which said strip is carried and a hand-operated spring-pressed engaging piece carried by the casing and adapted to engage the strip to move it in either direction.

EDWARD ABERLI.

Witnesses:
CHARLES E. SMITH,
JOHANNA M. STROPP.